United States Patent
Chen et al.

(10) Patent No.: US 6,310,141 B1
(45) Date of Patent: Oct. 30, 2001

(54) FLUOROPOLYMER-CONTAINING COMPOSITIONS

(75) Inventors: Lisa P. Chen, St. Paul, MN (US); Harald Kaspar, Burgkirchen (DE); Klaus Hintzer, Woodbury; Robert E. Kolb, Afton, both of MN (US); Albert Killich, Burgkirchen (DE)

(73) Assignee: Dyneon LLC, Oakdale, MN (US)

( * ) Notice: Subject to any disclaimer, the term of this patent is extended or adjusted under 35 U.S.C. 154(b) by 0 days.

(21) Appl. No.: 09/604,139

(22) Filed: Jun. 27, 2000

(51) Int. Cl.⁷ .................................................... C08L 27/12
(52) U.S. Cl. ............................................. 525/199; 525/200
(58) Field of Search ................................................ 525/199

(56) References Cited

U.S. PATENT DOCUMENTS

| | | | |
|---|---|---|---|
| 3,876,654 | 4/1975 | Pattison | 260/30.4 R |
| 4,233,421 | 11/1980 | Worm | 525/343 |
| 4,259,463 | 3/1981 | Moggi et al. | 525/331 |
| 4,696,989 | 9/1987 | Oka et al. | 528/254 |
| 4,787,991 * | 11/1988 | Morozumi | 252/12.4 |
| 4,912,171 | 3/1990 | Grootaert et al. | 525/340 |
| 5,262,490 | 11/1993 | Kolb et al. | 525/343 |
| 5,384,374 | 1/1995 | Guerra et al. | 525/326.4 |

FOREIGN PATENT DOCUMENTS

| | | | |
|---|---|---|---|
| 19716116 | 4/1997 | (DE) | C08L/27/12 |
| 0 591 888 | 10/1993 | (EP) | C08F/6/24 |
| 0 846 144 | 3/1997 | (EP) | C08L/27/12 |

OTHER PUBLICATIONS

*Modern Fluoropolymers*, "THV Fluoroplastic", John Schiers, Wiley Series, 1997, p. 257.

* cited by examiner

Primary Examiner—Paul R. Michl
(74) Attorney, Agent, or Firm—Dean M. Harts; James V. Lilly

(57) ABSTRACT

Cured, latex-blended compositions featuring a fluoroelastomer and a fluoroplastic, and curable core-shell polymers having a fluoroelastomer precursor-containing shell and a fluoroplastic-containing core.

24 Claims, No Drawings

FLUOROPOLYMER-CONTAINING COMPOSITIONS

BACKGROUND

This invention relates to preparing compositions that include a fluoroelastomer and a fluoroplastic.

Fluoroelastomers are elastomers prepared by curing an uncured fluoroelastomer precursor ("gum") made from monomers containing one or more atoms of fluorine, or copolymers of such monomers with other monomers, the fluoromonomer(s) being present in the greatest amount by mass. Fluoroelastomers have been used successfully in a number of applications due to their ability to withstand high temperatures and aggressive chemicals, as well as the ability of the fluoroelastomer gum to be processed using standard elastomer processing equipment. In addition, fluoroelastomers have been used in fuel management systems such as automotive fuel hoses, filler neck hoses, injector o-rings, and the like. Fuel management applications require low fuel vapor permeation in combination with good low temperature properties, sealability, and flexural properties.

Fluoroelastomers with high fluorine content show good fuel permeation resistance. However, high-fluorine content fluoroelastomers such as high-fluorine content terpolymers based on tetrafluoroethylene, vinylidene fluoride, and hexafluoropropylene have some limitations. For example, when the tetrafluoroethylene content (and thus the fluorine content) is high, flexibility and processability tend to be compromised. With respect to processability, the high fluorine content may render a fluoroelastomer too stiff for curative incorporation on standard processing equipment such as roll mills or Banbury mixers, which requires a material with a melting point less than about 100° C. On the other hand, when the hexafluoropropylene content, at the expense of vinylidene fluoride, is too high, both the polymerization rate and the cure rate may become unacceptably slow for commercial production.

Fluoroplastics are uncured plastics based on polymers made with monomers containing one or more atoms of fluorine, or copolymers of such monomers with other monomers, the fluoromonomer(s) being present in the greatest amount by mass. Examples include melt-processable co- and terpolymers based upon tetrafluoroethylene, hexafluoropropylene, and vinylidene fluoride. Such fluoroplastics have melting points greater than 100° C. and exhibit good resistance to fuel vapor permeation, as well as good low temperature properties, but compromise the flexural properties needed for flexible fuel management applications. For example, in fuel hoses the stiffness of these materials can lead to disadvantages such as wrinkling when the hoses are loaded onto forming mandrels, increased push-on force during hose installation, and sealing concerns at connection points.

SUMMARY

The invention provides compositions that combine the flexibility, low temperature properties, and processability of fluoroelastomers with the low vapor permeation associated with higher melting fluoroplastics. In one aspect, these advantages are achieved by providing a cured, latex-blended composition that includes: (a) a fluoroelastomer that is the reaction product of a plurality of monomers, at least two of which are selected from the group consisting of tetrafluoroethylene, vinylidene fluoride, hexafluoropropylene, and perfluorovinyl ethers; and (b) a fluoroplastic having a melting point of at least 100° C. (preferably between 110 and 320° C.), in which the fluoroplastic is the reaction product of a plurality of monomers, at least two of which are selected from the group consisting of tetrafluoroethylene, vinylidene fluoride, hexafluoropropylene, ethylene, and perfluorovinyl ethers. The fluoroelastomer forms a continuous phase. Preferably, the composition includes at least 50% by weight of the fluoroelastomer precursor and no greater than 50% by weight of the fluoroplastic.

In one embodiment, the fluoroelastomer includes the reaction product of 20–60 wt. % tetrafluoroethylene, 10–40 wt. % vinylidene fluoride, and 30–50 wt. % hexafluoropropylene. In another embodiment, the fluoroelastomer includes the reaction product of 0.1–10 wt. % of a perfluorovinyl ether in addition to these three monomers. A useful perfluorovinyl ether has the formula $CF_2=CF(OCF_2CF(CF_3))_mO(CF_2)_nCF_3$ where m=0–2 and n=0–6. Specific examples include PMVE (m=0, n=0), PPVE (m=0, n=2), PPVE-2 (m=1, n=2), and combinations thereof.

The fluoroelastomer may optionally include the reaction product of a cure-site monomer with the aforesaid monomers. Cure-site monomers facilitate subsequent curing by peroxide technology of the composition. Examples of suitable cure-site monomers include halogenated monomers, e.g., brominated monomers such as of bromotrifluoroethylene, 3,3,4,4-tetrafluoro-4-bromo-1-butene, bromo-substituted perfluorovinyl ethers, and combinations thereof The amount of cure-site monomer preferably ranges from 0.05 to 5 wt. %. Other cure-site monomers may also be employed.

Examples of suitable fluoroplastics include tetrafluoroethylene-hexafluoropropylenevinylidene fluoride terpolymers having a melting temperature ranging from 100 to 260° C., hexafluoropropylene-tetrafluoroethylene-ethylene terpolymers, ethylene-tetrafluoroethylene copolymers, hexafluoropropylene-tetrafluoroethylene copolymers, and tetrafluoroethyleneperfluoro(alkoxy alkane) copolymers.

The cured composition may be provided in the form of a shaped article or as a coating on a substrate. The properties of the cured composition make it particularly useful in articles for fuel management applications such as fuel hoses, seals, gaskets, o-rings, filler neck hoses, liners, and the like. The cured composition is also useful in chemical processing applications such as hoses, gaskets, seals, o-rings, liners, containers and the like.

The invention further features a method of preparing the above-described composition by providing a fluoroelastomer precursor and fluoroplastic in the form of separate latices; combining the two latices to form a blend, which optionally is coagulated and dried; and curing the blend. Coagulation may be accomplished using a high pressure homogenizer. Alternatively, the blend may be coagulated under high shear in the presence of dissolved gases. These methods are preferable to methods such as melt blending or dry blending because it enables the preparation of compositions that are substantially homogeneous. This feature, in turn, yields compositions with improved physical properties.

The fluoroelastomer precursor itself is too sticky to be coagulated using a high pressure homogenizer. However, the inclusion of the fluoroplastic makes it possible to process fluoroelastomer precursor-containing compositions using this method. Accordingly, it is possible to prepare a fluoroelastomer composition using coagulation methods normally associated with fluoroplastics.

In another aspect, the invention features a cured blend that includes: (a) a fluoroelastomer that is the reaction product of a plurality of monomers, at least two of which are selected from the group consisting of tetrafluoroethylene, vinylidene fluoride, hexafluoropropylene, and perfluorovinyl ethers; and (b) a fluoroplastic having a melting point of at least 100° C. (preferably between 110 and 320° C.), in which the fluoroplastic is the reaction product of a plurality of monomers, at least two of which are selected from the group consisting of tetrafluoroethylene, vinylidene fluoride, hexafluoropropylene, ethylene, and perfluorovinyl ethers, the composition being further characterized in that a least one of the monomers reacted to form the fluoroelastomer precursor, fluoroplastic, or both, is a perfluorovinyl ether in an amount ranging between 0.1 and 10% by weight. The fluoroelastomer forms a continuous phase. Preferably, the composition includes at least 50% by weight of the fluoroelastomer precursor and no greater than 50% by weight of the fluoroplastic.

In yet another aspect, the invention features a core-shell polymer that includes: (a) a fluoroelastomer precursor shell having a melting point less than 100° C. (preferably less than 90° C.), in which the fluoroelastomer precursor is the uncured reaction product of a plurality of monomers, at least two of which are selected from the group consisting of tetrafluoroethylene, vinylidene fluoride, hexafluoropropylene, and perfluorovinyl ethers; and (b) a fluoroplastic core having a melting point of at least 100° C. (preferably between 100 and 320° C.), in which the fluoroplastic is the reaction product of a plurality of monomers, at least two of which are selected from the group consisting of tetrafluoroethylene, vinylidene fluoride, hexafluoropropylene, ethylene, and perfluorovinyl ethers. When one of the monomers forming the fluoroplastic is tetrafluoroethylene or vinylidene fluoride, the fluoroplastic includes the reaction product of tetrafluoroethylene or vinylidene fluoride and greater than 3% by weight of co-monomer.

The core-shell polymers may be prepared in a number of ways, including changing the monomer feed at a desired point during polymerization to form a core and shell having different compositions, or by seed polymerization. Preferably, the ratio of core to shell on a weight to weight basis is between 50:50 and 10:90. The invention also features a cured composition prepared by reacting this core-shell polymer with a curative, as well as shaped articles and coatings based upon the cured composition.

The details of one or more embodiments of the invention are set forth in the description below. Other features, objects, and advantages of the invention will be apparent from the description and from the claims.

DETAILED DESCRIPTION

The compositions include a cured fluoroelastomer and an uncured, higher melting fluoroplastic. Prior to cure, the fluoroplastic is combined with a fluoroelastomer precursor (gum) and a curative. The identity and relative amounts of the fluoroelastomer precursor and fluoroplastic are selected to produce a curable composition that can be processed using standard elastomer processing equipment, and that, upon cure, produces a composition that exhibits good permeation resistance to fuel vapor while at the same time exhibiting good low temperature properties, sealability, and flexibility. In general, the curable composition includes at least 50% by weight of the fluoroelastomer precursor (preferably at least 60%, more preferably at least 70% by weight) and no greater than 50% by weight of the fluoroplastic (preferably no greater than 40%, more preferably no greater than 30% by weight).

Examples of suitable monomers, and relative amounts thereof, for preparing the fluoroelastomer precursor and the higher melting fluoroplastic are set forth in the Summary above. Particularly useful materials for the fluoroelastomer precursor are uncured terpolymers of 20–60 wt. % tetrafluoroethylene (TFE), 30–50 wt. % hexafluoropropylene (HFP), and 10–40% vinylidene fluoride (VDF). Particularly useful materials for the fluoroplastic are TFE-HFP-VDF terpolymers (melting temperature=110 to 260° C.; melt flow index at 265° C. under a 5 kg load=1–30 g/10 min.), hexafluoropropylene-tetrafluoroethylene-ethylene (HTE) terpolymers (melting temperature=150 to 280° C.; melt flow index at 297° C. under a 5 kg load=1–30 g/10 min.), ethylene-tetrafluoroethylene (ETFE) copolymers (melting temperature=250 to 275° C.; melt flow index at 297° C. under a 5 kg load=1–30 g/10 min.), hexafluoropropylene-tetrafluoroethylene (FEP) copolymers (melting temperature=250 to 275° C.; melt flow index at 372° C. under a 5 kg load=1–30 g/10 min.), and tetrafluoroethylene-perfluoro(alkoxy alkane) (PFA) copolymers (melting temperature=300 to 320° C.; melt flow index at 372° C. under a 5 kg load=1–30 g/10 min.). Each of these fluoroplastics is commercially available from Dyneon Corp., Oakdale, Minn. The TFE-HFP-VDF terpolymers are sold under the designation "THV". The foregoing polymers may be modified by incorporating from 0.1 to 10 weight percent of a perfluorovinyl ether. Preferably this ether has the formula $CF_2=CF(OCF_2CF(CF_3))_mO(CF_2)_nCF_3$ described above.

Useful curatives include both peroxides or polyol/onium salt combinations. Useful peroxides include dialkyl peroxides, with di-tertiary butyl peroxides being particularly preferred. Specific examples include 2,5-dimethyl-2,5-di(tertiarybutylperoxy)-hexyne-3 and 2,5-dimethyl-2,5-di(tertiarybutylperoxy)-hexane. Additional examples of useful peroxides include dicumyl peroxide, dibenzoyl peroxide, tertiarybutyl perbenzoate, and di[1,3-dimethyl-3-(tertiarybutylperoxy)-butyl]carbonate.

One or more crosslinking co-agents may be combined with the peroxide. Examples include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N'N'-tetraallyl terephthalamide; N,N,N',N'-teraallyl malonamide; trivinyl isocyanurate; 2,4,6-trivinyl methyltrisiloxane; and tri(5-norbornene-2-methylene) cyanurate.

Suitable onium salts are described, for example, in U.S. Pat. Nos. 4,233,421; 4,912,171; and 5,262,490, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

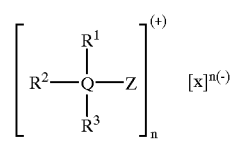

where

Q is nitrogen or phosphorus;

Z is a hydrogen atom or is a substituted or unsubstituted, cyclic or acyclic alkyl group having from 4 to about 20 carbon atoms that is terminated with a group of the formula —COOA where A is a hydrogen atom or is a $NH_4^+$ cation or Z is a group of the formula $CY_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;

$R_1$, $R_2$, and $R_3$ are each, independently, a hydrogen atom or an alkyl, aryl, alkenyl, or any combination thereof, each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above;

X is an organic or inorganic anion (e.g., halide, sulfate, acetate, phosphate, phosphonate, hydroxide, alkoxide, phenoxide, or bisphenoxide); and n is a number equal to the valence of the anion X.

Suitable polyols for use with the onium salt include polyhydroxy aromatic compounds such as 2,2-bis(4-hydroxyphenyl)propane [bisphenol A], 2,2-bis(4-hydroxyphenyl)perfluoropropane [bisphenol AF], hydroquinone, catechol, resorcinol, 4,4'-dihydroxydiphenyl, 4,4'-dihydroxydiphenylmethane, 4,4'-dihydroxydiphenylsulfone, and 2,2-bis(4-hydroxydiphenylbutane), their alkali metal salts, alkaline earth metal salts, and combinations thereof. Other useful polyols are described, e.g., in U.S. Pat. Nos. 4,259,463; 3,876,654; 4,912,171; 4,233,421; and 5,384,374, each of which is incorporated by reference.

The curable composition can also include fillers to improve the physical properties of both the curable and the cured composition. Examples of suitable fillers include reinforcing agents (e.g., thermal grade carbon blacks or non-black pigments), silica, graphite, clay, talc, diatomaceous earth, barium sulfate, titanium oxide, wollastonite, and combinations thereof. Other ingredients that may be added to the composition, alone or in combination with one or more fillers, include, for example, plasticizers, lubricants, retarding agents, processing aids, pigments, and combinations thereof.

One preferred method of preparing the curable composition involves preparing the fluoroelastomer precursor and fluoroplastic in the form of latices, combining the two latices, and then optionally coagulating the resulting combination to form a blend. Latex blending is preferred because it produces a substantially homogeneous blend in which the fluoroelastomer precursor and fluoroplastic are intimately mixed with each other and uniformly distributed throughout the blend.

The fluoroelastomer precursor and fluoroplastic latices are preferably prepared using conventional aqueous-based emulsion polymerization techniques. Suitable polymerization initiators for this purpose include permanganate initiators, with potassium permanganate being particularly preferred, and persulfate initiators, with ammonium and potassium persulfates being particularly preferred. The fluoroplastic latex preferably is cation-exchanged to replace cations with hydrogen ions prior to combining this latex with the fluoroelastomer precursor latex.

To enhance processability, multimodal molecular weight fluoroelastomer precursor compositions may be used. Such compositions may be prepared by latex blending different molecular weight latices, or by broadening the molecular weight distribution during polymerization, e.g., by using different levels of chain transfer agents or different amounts of initiators during the course of the reaction.

Once combined, the fluoroelastomer precursor and fluoroplastic latices are preferably coagulated using salt-free coagulation methods, for example a high pressure homogenizer, although high shear coagulation in the presence of dissolved gas, as described in co-pending Dyneon German Application No. 100 03 587.6 filed Jan. 28, 2000, can be used as well. Salt-free coagulation methods ensure higher purity and homogeneity of the material. High pressure coagulation techniques are well-known fluoroplastic processing techniques. Examples of suitable protocols are described in EP 591888. In general, high pressure homogenization involves compressing and decompressing the fluoroelastomer precursor/fluoroplastic latex combination through a series of small openings to form a coagulated blend. The coagulated blend is then transferred onto a filter where it is washed and then de-watered before being broken up into a free-flowing, moldable product and dried to remove any residual moisture.

Prior to cure, the coagulated and dried curable composition is combined with a curative, preferably by milling the finely divided solids into the gum stock. However, other conventional rubber mixing devices, such as Banbury mixers, can be used as well. For best results the temperature of the mixture on the mill should not rise above about 120° C.

The molding and curing process typically involves extruding the blend into the desired shape and then autoclaving at temperatures between 125 and 180° C. (more preferably between 150 and 170° C.) for 10–120 minutes (typically 30–60 minutes). Alternatively, articles can be prepared by compression molding the compounded blend in a mold e.g., a cavity or a transfer mold, followed by oven curing. Compression molding of the compounded blend (press cure) is typically conducted at a temperature between about 95° C. and about 230° C., preferably between about 150° C. and about 205° C., for a period of from 5 minutes to about 5 hours, usually from 10 minutes to 60 minutes. A pressure of between about 500 kPa and about 15,000 kPa, preferably between about 4,000 kPa and about 8,000 kPa, is imposed on the compounded mixture in the mold. The molded vulcanizate is then usually post cured (oven cured) at a temperature between about 150° C. and about 260° C., usually at about 232° C., for a period of from about 2 hours to 30 hours or more depending on the cross-sectional thickness of the sample. For thick sections, the temperature during the post cure is usually raised gradually from the lower limit of the range to the desired maximum temperature selected. For thinner cross-sections, e.g., less than 5 mm, the vulcanizate or cured sheet section may be put into the oven at the desired maximum temperature. The maximum temperature used is preferably about 260° C. and is held at this value for about 4 hours or more.

A second preferred method of producing a fluoroelastomer precursor-fluoroplastic composition in which the fluoroelastomer precursor and fluoroplastic are intimately combined with each other is to prepare the composition in the form of a core-shell polymer in which the fluoroplastic forms the core and is surrounded by a thin shell of the fluoroelastomer precursor. Core-shell polymers may be prepared in a number of ways, including changing the monomer feed at a desired point during polymerization to form a core and shell having different compositions, or by seed polymerization. An example of a process for preparing such a core-shell polymer is described below in the Examples section.

The invention will now be described further by way of the following examples.

EXAMPLES

Test Methods

Mooney Viscosity (ML): ASTM D1646. Unless otherwise noted, the Mooney viscosity was determined from compositions containing only fluoroelastomer gum and curative or the blend of fluoropolymers and curative using a 1 minute pre-heat and a 10 minute test at 121° C.

Melt Flow Index (MFI): ASTM D 1238, 265° C., 5 kg load unless otherwise noted.

Melting Point: ASTM 4591.

Press Cure Conditions: Unless otherwise noted, 76×152×2 mm sheets were prepared for physical property testing by pressing at 5 to 7 MPa at 177° C. for 10 minutes.

Hardness: ASTM D2240 Method A. Shore A durometer was used.

Tensile Stress at Break ($T_B$), Elongation at Break ($E_B$), Stress at 100% Elongation ($M_{100}$): ASTM D412 using Die D at 25° C.

Flexural Modulus: ASTM D790 Method 1. 32×6.23 mm samples were die cut from press-cured plaques and tested at room temperature using a 28 mm support span and 0.01 $min^{-1}$ strain rate.

Low Temperature Performance: Samples were prepared following the procedure used to prepare test samples for flexural modulus tests. The samples were tested for breakage in a 3-point bend configuration at −34° C. and −40° C. using a 25 mm support span and a 20 in./min. crosshead speed. Samples were evaluated on a pass-fail basis.

Processing Evaluation: A Monsanto Processability Tester (MPT) equipped with a 1.50 mm diameter die of L/D=10 was used to determine pressures required to extrude each compound at shear rates of 180, 361, 723, and 1446 $sec^{-1}$. All compounds were tested at 105° C. unless otherwise noted.

Vapor Transmission: ASTM D814. The test fluid used was a mixture of 42.5% toluene, 42.5% isooctane, and 15% methanol by volume. Sheets of 0.75–0.90 mm thickness of each composition were press-cured. 3 inch diameter samples were die cut from each sheet. Vapor transmission cups, each with a 2.5 inch diameter opening (4.909 $in^2$ exposed sample surface) and approximately 160 cc capacity, were used and are available from Thwing-Albert Instrument Co. High fluorine, low durometer fluoroelastomer gaskets insured a good seal between the sample and the test fluid. The cups were assembled by placing 100 cc of fluid in the cup, a 0.5 mm gasket between the cup and sample, and a 1.5 mm gasket between the sample and clamping ring. Because the samples were extensible during testing, a 16-mesh circular screen was placed between the upper gasket and clamping ring. All tests were conducted at 40° C. for 32 days with the cup maintained in the upright position. The cups were weighed approximately every other day. The first 7 days of testing allowed for sample equilibration time, so data collected during this time was not used to calculate the vapor transmission rate. The rate is then multiplied by the thickness of the sample in millimeters to normalize each value. Two samples per compound were tested and averaged.

Example 1

A fluoroelastomer precursor was prepared in the form of a latex ("Latex 1") by aqueous emulsion polymerization using a perfluorooctanoic acid emulsifier and an ammonium persulfate initiator. The fluoroelastomer precursor consisted of 26.3 wt. % VDF, 34.7 wt. % HFP, and 39 wt. % TFE. It had a melting point of 65° C. The solids content of the latex was 28 wt. %.

A fluoroplastic was prepared in the form of a latex ("Latex 2") by aqueous emulsion polymerization in a similar manner using a $KMnO_4$ initiator at 60° C. The fluoroplastic consisted of 29.0 wt. % VDF, 18.0 wt. % HFP, and 53.0 wt. % TFE. It had a melting point of 145° C. and a melt flow index, measured at 265° C. under a 5 kg load, of 10 g/10 min. The solids content of the latex was 30 wt. %. The latex was run through a cation-exchange column (Bayer Lewatit SPI112, $H^+$ form) to remove ions prior to further use.

Latex 1 and Latex 2 were blended undiluted such that the solid polymers were in a ratio of 70:30 by weight. The resulting blend was then pressurized in a high pressure homogenizer (APV-Gaulin GmbH, Luebeck, Germany) to 300 bar and then expanded through slits, whereupon the blend coagulated almost quantitatively to form a slurry. The slurry was pumped to a storage tank and diluted with water, after which it was pumped to a continuous vacuum filter press (Pannevis), washed, and de-watered. The de-watered composition was dried in a tumble dryer at 70° C. for 15 hrs under vacuum.

The dried blend was mixed with bisphenol AF crosslinking-agent (available from Aldrich Chemical Co.) and the following onium accelerators on a two roll mill:

Phosphonium A, which is the complex

$(C_4H_9)_3P^+CH_2CH(CH_3)OCH_3{}^-OC_6H_4C(CF_3)_2C_6H_4OH$ which is tributylmethoxypropylphosphonium chloride prepared from tributylphosphene (available from Cytec), allylchloride, and methanol and then reacting with the sodium salt of bisphenol AF;

Phosphonium B, which is a complex which is prepared by reacting tributylmethoxypropylphosphonium chloride with the sodium salt of perfluorooctyl-n-methylsulfonamide.

After measuring the Mooney viscosity of the curative-containing blend, the following other compounding ingredients were added: 30 phr carbon black (N990 MT available from R.T. Vanderbilt), 3 phr magnesium oxide (Elastomag 170 from Morton International), and 6 phr calcium hydroxide. The composition was prepared in the form of individual sheets measuring 76×152×2 mm by pressing at 5–7 MPa at 165° C. for 50 minutes, and then tested for various properties according to the test protocols set forth above. The test results are reported in Table 1.

Example 2

This example is similar to Example 1 except that the fluoroplastic consisted of 22.0 wt. % VDF, 18.0 wt. % HFP, and 60.0 wt. % TFE, and had a melting point of 165° C. and a melt flow index, measured at 265° C. under a 5 kg load, of 10 g/10 min. The blend was compounded with curatives and fillers, and tested as in Example 1. The test results are reported in Table 1.

Comparative Example C1

For the purposes of comparison, a sample containing only fluoroelastomer was prepared and tested according to the procedures described in Example 1. The fluoroelastomer precursor consisted of 26.3 wt. % VDF, 34.7 wt. % HFP, and 39 wt. % TFE. The latex was coagulated by adding it dropwise to an aqueous $MgCl_2$ solution with agitation, after which it was de-watered and washed three times with deionized water (60–70° C.). After drying overnight at 130° C. in an air circulating oven, the fluoroelastomer precursor was compounded and tested as in Example 1. The amount of curatives was adjusted to compensate for the increased fluoroelastomer precursor content. The test results are reported in Table 1. Although the fluoroelastomer composition of Comparative Example C1 is more flexible and processible than Examples 1 and 2, the vapor transmission rate of Comparative Example C1 is 46% higher than Examples 1 and 2.

Comparative Example C2

For the purposes of comparison, a blend of a fluoroelastomer precursor and fluoroplastic was prepared by melt blending, rather than by latex blending. 315 g of the fluoroelastomer precursor described in Example 1 was charged into a Haake Rheomix 3000 with Banbury blades at 210° C. and 40 rpm. As soon as the gum became molten, 135 g of fluoroplastic pellets with a composition of 29.0 wt. % VDF, 18.0 wt. % HFP, and 53.0 wt. % TFE were added. The fluoroplastic had a melting point of 145° C. and a melt flow index, measured at 265° C. under a 5 kg load, of 10 g/10 min. The mixing speed was increased to 60 rpm, and mixing proceeded for another 10 minutes, after which the composition was removed from the mixer and allowed to cool to room temperature. It was then compounded as reported in Table 1 and tested as described in Example 1. The results are reported in Table 1. Although Example 1 and Comparative Example C2 are similar in composition, the pressure required to extrude Comparative Example C2 (melt blend) is 11% to 14% higher compared to Example 1 (latex blend) for similar shear rates. In addition, Comparative Example C2 is also 24% stiffer (as measured by the flexural modulus) compared to Example 1.

Comparative Example C3

For the purposes of comparison, a second blend of a fluoroelastomer precursor and fluoroplastic was prepared by melt blending, rather than by latex blending. 315 g of the fluoroelastomer precursor described in Example 1 was charged into a Haake Rheomix 3000 with Banbury blades at 210° C. and 40 rpm. As soon as the gum became molten, 135 g of fluoroplastic pellets with a composition of 22.0 wt. % VDF, 18.0 wt. % HFP, and 60.0 wt. % TFE were added. The fluoroplastic had a melting point of 165° C. and a melt flow index, measured at 265° C. under a 5 kg load, of 10 g/10 min. The mixing speed was increased to 60 rpm, and mixing proceeded for another 10 minutes, after which the composition was removed from the mixer and allowed to cool to room temperature. It was then compounded as reported in Table 1 and tested as described in Example 1. The results are reported in Table 1. Although Example 2 and Comparative Example C3 are similar in composition, the pressure required to extrude Comparative Example C3 (melt blend) is 20% to 25% higher compared to Example 2 (latex blend) for similar shear rates, as shown by the MPT results. In addition, Comparative Example C3 is also 34% stiffer, as measured by the flexural modulus, compared to Example 2.

TABLE 1

| EXAMPLE | 1 | 2 | C1 | C2 | C3 |
|---|---|---|---|---|---|
| Composition | | | | | |
| Fluoropolymer Latex Blend 1 (phr) | 100 | | | | |
| Fluoropolymer Latex Blend 2 (phr) | | 100 | | | |
| Fluoropolymer Elastomer (phr) | | | 100 | | |
| Fluoropolymer Melt Blend 1 (phr) | | | | 100 | |
| Flurorpolymer Melt Blend 2 (phr) | | | | | 100 |
| Bisphenol AF (mmhr) | 4.28 | 4.28 | 6.10 | 4.28 | 4.28 |
| Phosphonium A (mmhr) | 0.54 | 0.54 | 0.78 | 0.54 | 0.54 |
| Phosphonium B (mmhr) | 1.37 | 1.37 | 1.96 | 1.37 | 1.37 |
| Carbon black (phr) | 30 | 30 | 30 | 30 | 30 |
| MgO (phr) | 3 | 3 | 3 | 3 | 3 |
| $Ca(OH)_2$ (phr) | 6 | 6 | 6 | 6 | 6 |
| Uncured Properties | | | | | |
| ML 1 + 10 @ 121° C. | 66 | 51 | 21 | 58 | 49 |
| MPT (MPa) | | | | | |
| 180 $s^{-1}$ | 34.7 | 32.7 | 25.6 | 38.6 | 39.2 |
| 361 $s^{-1}$ | 38.2 | 35.6 | 28.2 | 43.1 | 43.7 |
| 723 $s^{-1}$ | 41.9 | 38.4 | 31.2 | 48.0 | 48.0 |
| 1446 $s^{-1}$ | 46.3 | 42.7 | 35.1 | 52.3 | 52.5 |
| Cured Properties | | | | | |
| Durometer (Shore A) | 90 | 89 | 86 | 90 | 91 |
| $T_B$ (MPa) | 11.7 | 11.5 | 10.3 | 11.8 | 12.4 |
| $E_B$ (%) | 238 | 216 | 230 | 218 | 215 |
| $M_{100}$ (MPa) | 8.5 | 8.4 | 7.2 | 8.8 | 9.4 |
| Flexural Modulus (MPa) | 100 | 108 | 93 | 124 | 145 |
| Vapor Transmission Rate (g · mm/$m^2$ · day)) | 13 | 13 | 19 | 13 | 13 |

The results reported in Table 1 demonstrate that the latex-blended compositions achieved good vapor permeation resistance, while remaining flexible, in contrast to compositions containing only the fluoroelastomer and melt-blended compositions.

Example 3

This example is similar to Example 1 except that the fluoroelastomer precursor contained 33.7 wt. % VDF, 42.1 wt. % HFP, 23.5 wt. % TFE, and 0.7 wt. % bromotrifluoroethylene. It had no measurable melting point. The fluoroplastic was a copolymer of 96 wt. % TFE and 4 wt. % perfluoropropylvinylether. It had a melting point of 308° C. and a melt flow index of 2.2 g/10 min. tested at 372° C. under a 5 kg load. The blend ratio by weight of solids of fluoroelastomer precursor:fluoroplastic was 80:20. The blend is peroxide-curable and was compounded with TAIC DLC-A crosslinking agent available from Harwick Chemical Mfg. Corp., Varox DBPH-50 peroxide curative from R.T. Vanderbilt Co., and fillers, as described in Table 2, and tested as in Example 1 with the exception that flexural modulus was evaluated for samples cut from plaques that were press-cured for 50 minutes at 165° C. In addition, Mooney viscosity of the uncured blend was evaluated in the absence of curative and fillers. The test results are reported in Table 2. "TAIC" refers to triallyl isocyanurate.

Example 4

This example is similar to Example 3, except the blend ratio by weight of solids of fluoroelastomer precursor:fluoroplastic was 70:30. In addition, curatives and fillers were adjusted based on the amount of fluoroelastomer precursor in the blend. The test results are reported in Table 2. In contrast, the vapor transmission rate of the fluoroelastomer alone (compounded with 3.5 phr TAIC DLC-A, 2.5 phr Varox DBPH-50, 15 phr carbon black, and 3 phr $Ca(OH)_2$)

is 37 g.mm/m².day, which is more than 50% greater than Examples 3 and 4. Examples 3 and 4 also demonstrate that latex blends with fluoroplastic can still be extruded at reasonable extrusion pressure, as shown by the MPT results. The low temperature performance indicates that Example 3 remains flexible at temperatures as low as −40° C. and that Example 4 remains flexible at −34° C.

TABLE 2

| EXAMPLE | 3 | 4 |
|---|---|---|
| Composition | | |
| Fluoropolymer Latex Blend 3 (phr) | 100 | |
| Fluoropolymer Latex Blend 4 (phr) | | 100 |
| TAIC DLC-A (phr) | 2.8 | 2.45 |
| Varox DBPH-50 (phr) | 2.0 | 1.75 |
| Carbon black (phr) | 12 | 10.5 |
| Ca(OH)$_2$ (phr) | 2.4 | 2.1 |
| Uncured Properties | | |
| ML 1 + 10 @ 121° C. | 78 | 44 |
| MPT (MPa) | | |
| 180 s$^{-1}$ | 37.6 | 30.3 |
| 361 s$^{-1}$ | 41.3 | 34.9 |
| 723 s$^{-1}$ | 44.8 | 38.7 |
| 1446 s$^{-1}$ | 48.6 | 42.5 |
| Cured Properties | | |
| Durometer (Shore A) | 75 | 78 |
| T$_B$ (MPa) | 14.5 | 10.4 |
| E$_B$ (%) | 200 | 230 |
| M$_{100}$ (MPa) | 5.4 | 4.4 |
| Flexural Modulus (MPa) | 17 | 21 |
| Low Temperature Flex | | |
| −34° C. | Pass | Pass |
| −40° C. | Pass | Fail |
| Vapor Transmission Rate (g · mm/(m² · day)) | 24 | 22 |

Example 5

This example describes the preparation of a composition in the form of a core-shell polymer.

A polymerization vessel with a total volume of 186 l equipped with an impeller agitator system was charged with 115 liters deionized water, 8 g oxalic acid, 48 g ammonium oxalate, and 295 g perfluorooctanoate ammonium salt (PFOA). The vessel was degassed and then charged with nitrogen to assure that all oxygen had been removed. The vessel was then heated up to 60° C. and the agitation system set to 210 rpm. Next, the vessel was charged with reactants as follows: (a) ethane to a pressure of 0.43 bar absolute, (b) HFP to a pressure of 3.85 bar absolute, (c) VDF to a pressure of 4.52 bar absolute, and (d) TFE to a pressure of 7.0 bar absolute. Following charging of the reactants, the polymerization was initiated by adding 25 ml of a 2.4% aqueous potassium permanganate solution. As the reaction started, a reaction pressure of 7.0 bar absolute was maintained by feeding additional TFE, HFP and VDF into the gas phase with a feeding ratio HFP (kg)/TFE (kg) of 0.143 and VDF (kg)/TFE (kg) of 0.170. During the polymerization, additional aqueous potassium permanganate solution was continuously charged into the vessel at a feeding rate of 120 ml/h, while maintaining a reaction temperature of 60° C., until 11.5 kg of TFE had been added, at which point the potassium permanganate feed was stopped. The polymerization then slowed down and fully stopped after 15 min.

Next, 360 g PPVE-2 were added, after which the vessel was charged with the following reactants: (a) ethane to a pressure of 8.0 bar absolute, (b) HFP to a pressure of 14.9 bar absolute, and (c) VDF to a pressure of 15.6 bar absolute. The polymerization reaction was then restarted by continuously feeding the 2.4% aqueous potassium permanganate solution into the reaction vessel at a feed rate of 120 ml/h. A reaction pressure of 15.6 bar absolute was maintained by feeding additional TFE, HFP, and VDF into the gas phase at a feeding ratio of HFP (kg)/TFE (kg) of 0.914 and VDF (kg)/TFE (kg) of 0.630. After 14.4 kg TFE had been added, the addition of permanganate solution was stopped and the monomer input valves closed. The addition of potassium permanganate solution was then resumed at a feed rate of 40 ml/h. Within 15 min, the monomer gas phase had reacted down to a vessel pressure of 11.6 bar. At this point, the reactor was vented and flushed with N$_2$.

The process yielded 162 kg of a polymer dispersion having a core-shell morphology consisting of 31% by weight fluoroplastic core (high melting TFE/HFP/VDF terpolymer) and 69% by weight low melting fluoroelastomer precursor shell (TFE/HFP/VDF/PPVE-2 polymer). The core had a diameter of 81 nm according to dynamic light scattering and the final latex particle (core plus shell) had a diameter of 120 nm. The polymer dispersion had a solids content of 30%.

The dispersion was diluted with 100 liters deionized water and was coagulated by adding 2.5 liters concentrated hydrochloric acid. The coagulated polymer was washed three times with deionized water and afterwards dried in an oven at 50° C. for 48 hours to yield 48 kg of a free-flowing polymer that exhibited two melting points in a DSC scan: one with a melting point maximum of 69° C. and a heat of fusion of 0.6 J/g and a second one with a melting point maximum at 230° C. and a heat of fusion of 6.2 J/g. The polymer also had a melt flow index, measured at 265° C. under a 5 kg load, of 35 g/10 min.

The polymer was compounded with various fillers and tested as described in Example 1. The results are reported in Table 3.

Example 6

This example is similar to Example 1 except that the fluoroelastomer precursor consisted of 26.2 wt. % VDF, 30.1 wt. % HFP, 43.0 wt. % TFE, and 0.7 wt. % PPVE-2, and the fluoroplastic consisted of 12.0 wt. % VDF, 12.0 wt. % HFP, and 76.0 wt. % TFE, and had a melting point of 235° C. and a melt flow index, measured at 265° C. under a 5 kg load, of 6 g/10 min. The blend was compounded with curatives and fillers, and tested as in Example 1. The Mooney viscosity was measured using a 5 minute preheat (ML 5+10@121° C.). Because this blend had a higher Mooney viscosity, 20 phr carbon black was used in the compound. The test results are reported in Table 3. The test results demonstrate that a core-shell composition (Example 5) and a latex blended composition (Example 6) having similar compositions have similar properties.

TABLE 3

| EXAMPLE | 5 | 6 |
|---|---|---|
| Composition | | |
| Fluoropolymer Core Shell (phr) | 100 | |
| Fluoropolymer Latex Blend (phr) | | 100 |
| Bisphenol AF (mmhr) | 6.10 | 4.28 |
| Phosphonium A (mmhr) | 0.78 | 0.54 |

TABLE 3-continued

| EXAMPLE | 5 | 6 |
|---|---|---|
| Phosphonium B (mmhr) | 1.96 | 1.37 |
| carbon black (phr) | 20 | 20 |
| MgO (phr) | 3 | 3 |
| Ca(OH)$_2$ (phr) | 6 | 6 |
| Uncured Properties | | |
| ML 5 + 10 @ 1210 C. | 62 | 84 |
| Cured Properties | | |
| Durometer (Shore A) | 91 | 93 |
| T$_B$ (MPa) | 15.2 | 14.9 |
| E$_B$ (%) | 145 | 275 |
| Flexural Modulus (MPa) | 182 | 178 |
| Low Temperature Flex | | |
| −34° C. | Pass | Pass |
| −40° C. | Fail | Fail |
| Vapor Transmission Rate (g · mm/(m$^2$day)) | 11 | 9 |

Other embodiments are within the following claims.

What is claimed is:

1. A cured, latex-blended composition comprising:
   (a) a fluoroelastomer comprising the reaction product of two or more monomers selected from the group consisting of tetrafluoroethylene, vinylidene fluoride, hexafluoropropylene, and perfluorovinyl ethers; and
   (b) a fluoroplastic having a melting point of at least 100° C., said fluoroplastic comprising the reaction product of two or more monomers selected from the group consisting of tetrafluoroethylene, vinylidene fluoride, hexafluoropropylene, ethylene, and perfluorovinyl ethers,
   wherein said fluoroelastomer forms a continuous phase.

2. A composition according to claim 1 wherein said composition comprises at least 50% by weight of said fluoroelastomer and no greater than 50% by weight of said fluoroplastic.

3. A composition according to claim 1 wherein said fluoroplastic has a melting point ranging from 110° C. to 320° C.

4. A composition according to claim 1 wherein said fluoroelastomer comprises the reaction product of tetrafluoroethylene, vinylidene fluoride, and hexafluoropropylene.

5. A composition according to claim 4 wherein said fluoroelastomer comprises the reaction of 20–60 wt. % tetrafluoroethylene, 10–40 wt. % vinylidene fluoride, and 30–50 wt. % hexafluoropropylene.

6. A composition according to claim 1 wherein said fluoroelastomer comprises the reaction product of tetrafluoroethylene, vinylidene fluoride, hexafluoropropylene, and a perfluorovinyl ether.

7. A composition according to claim 6 wherein said fluoroelastomer comprises the reaction product of 20–60 wt. % tetrafluoroethylene, 10–40 wt. % vinylidene fluoride, 30–50 wt. % hexafluoropropylene, and 0.1–10 wt. % of a perfluorovinyl ether.

8. A composition according to claim 1 wherein said fluoroelastomer comprises the reaction product of a cure-site monomer and two or more monomers selected from the group consisting of tetrafluoroethylene, vinylidene fluoride, hexafluoropropylene, and perfluorovinyl ethers.

9. A composition according to claim 8 where the amount of said cure-site monomer is between 0.05 and 5 wt. %, and said cure-site monomer is selected from the group consisting of bromine-containing monomers, iodine-containing monomers, and combinations thereof.

10. A composition according to claim 1 wherein said perfluorovinyl ether has the formula $CF_2=CF(OCF_2CF(CF_3))_mO(CF_2)_nCF_3$ where m=0–2 and n=0–6.

11. A composition according to claim 10 wherein said perfluorovinyl ether is selected from the group consisting of $CF_2=CFO(CF_2)_2CF_3$, $CF_2=CFOCF_2CF(CF_3)O(CF_2)_2CF_3$, and $CF_2=CFOCF_3$.

12. A composition according to claim 1 wherein said fluoroplastic comprises a tetrafluoroethylene-hexafluoropropylene-vinylidene fluoride terpolymer having a melting temperature ranging from 110 to 260° C.

13. A composition according to claim 1 wherein said fluoroplastic is selected from the group consisting of tetrafluoroethylene-perfluoro(alkoxy alkane) copolymer, hexafluoropropylene-tetrafluoroethylene-ethylene terpolymer, ethylene-tetrafluoroethylene copolymer, and hexafluoropropylene-tetrafluoroethylene copolymer.

14. A cured composition according to claim 1 wherein said cured composition is in the form of a shaped article.

15. A cured composition according to claim 1 wherein said cured composition is in the form of a coating on a substrate.

16. A cured blend comprising:
   (a) a fluoroelastomer comprising the uncured reaction product of two or more monomers selected from the group consisting of tetrafluoroethylene, vinylidene fluoride, hexafluoropropylene, and perfluorovinyl ethers; and
   (b) a fluoroplastic having a melting point of at least 100° C.,
   said fluoroplastic comprising the reaction product of two or more monomers selected from the group consisting of tetrafluoroethylene, vinylidene fluoride, hexafluoropropylene, ethylene, and perfluorovinyl ethers,
   wherein at least one of the monomers reacted to form said fluoroelastomer precursor, said fluoroplastic, or both, is a perfluorovinyl ether in an amount between 0.1 and 10% by weight,
   wherein said fluoroelastomer forms a continuous phase.

17. A core-shell polymer comprising:
   (a) a shell comprising a fluoroelastomer precursor having a melting point less than 100° C.,
   said fluoroelastomer precursor comprising the uncured reaction product of two or more monomers selected from the group consisting of tetrafluoroethylene, vinylidene fluoride, hexafluoropropylene, and perfluorovinyl ethers; and
   (b) a core comprising a fluoroplastic having a melting point of at least 100° C.,
   said fluoroplastic comprising the reaction product of two or more monomers selected from the group consisting of tetrafluoroethylene, vinylidene fluoride, hexafluoropropylene, ethylene, and perfluorovinyl ethers,
   with the proviso that when one of the monomers forming said fluoroplastic is tetrafluoroethylene or vinylidene fluoride, said fluoroplastic comprises the reaction product of tetrafluoroethylene or vinylidene fluoride and greater than 3% by weight of a co-monomer selected from the group consisting of hexafluoropropylene, ethylene, and perfluorovinyl ethers.

18. A core-shell polymer according to claim 17 wherein said fluoroplastic comprises the reaction product of tetrafluoroethylene, vinylidene fluoride, and hexafluoropropylene.

19. A core-shell polymer according to claim 17 wherein the ratio of said core to said shell on a weight-to-weight basis is between 50:50 and 10:90.

20. A cured composition comprising the cured product of a curative and a curable composition according to claim 17.

21. A method of preparing a cured composition comprising:

(a) providing a first latex comprising a fluoroelastomer precursor having a melting point less than 110° C., said fluoroelastomer precursor comprising the uncured reaction product of two or more monomers selected from the group consisting of tetrafluoroethylene, vinylidene fluoride, hexafluoropropylene, and perfluorovinyl ethers;

(b) providing a second latex comprising a fluoroplastic having a melting point of at least 110° C., said fluoroplastic comprising the reaction product of two or more monomers selected from the group consisting of tetrafluoroethylene, vinylidene fluoride, hexafluoropropylene, ethylene, and perfluorovinyl ethers;

(c) combining said first latex and said second latex together to form a blend;

(d) coagulating said blend; and (e) curing said blend.

22. A method according to claim 21 wherein the blend is coagulated using a salt-free coagulation method.

23. A method according to claim 21 comprising coagulating said blend using a high pressure homogenizer.

24. A method according to claim 21 comprising coagulating said blend under high shear in the presence of dissolved gases.

* * * * *